United States Patent [19]
Jennings, Jr.

[11] 3,724,546
[45] Apr. 3, 1973

[54] BLOOD FLOOD

[75] Inventor: Harley Y. Jennings, Jr., Fullerton, Calif.

[73] Assignee: Chevron Research Company, San Francisco, Calif.

[22] Filed: Jan. 11, 1971

[21] Appl. No.: 105,192

[52] U.S. Cl. .................................................166/274
[51] Int. Cl. .............................................E21b 43/16
[58] Field of Search ........166/274, 275, 270; 175/65; 252/8.55 D

[56] References Cited

UNITED STATES PATENTS

| | | | |
|---|---|---|---|
| 2,920,041 | 1/1960 | Meadors | 166/274 |
| 2,209,591 | 7/1940 | Barnes | 252/8.5 C |
| 2,341,500 | 2/1944 | Detling | 252/8.55 D |

Primary Examiner—Robert L. Wolfe
Attorney—Ralph L. Freeland, Jr., J. A. Buchanan and G. F. Magdeburger

[57] ABSTRACT

A method of using whole animal blood, or a selected fraction of it, is disclosed as a suitable fluid for assisting recovery of petroleum from a reservoir. Bovine or other animal blood recovered from meat slaughtering is pumped into an oil reservoir from an injection well. It is injected either as a solution with flooding water or followed by water after injection in undiluted form. If desired a clotting retardant, such as citric acid or EDTA (ethylenediaminetetraacetic acid) may be added to the blood to prevent coagulation before contacting fluids in the reservoir. Improved oil recovery from the reservoir over straight water flood is believed to be due to the oil-to-water mobility ratio increase by the addition of blood to the drive fluid. Both blood's high natural viscosity and the ability to polymerize its fibrinogen to form fibrin upon contact with the reservoir rock and fluids are contributing factors. At the same time, its colloidal content, cells and platelets, either as a fraction of, or in the whole blood, tend to plug larger permeability channels of the reservoir rock and thereby inhibit bypassing of petroleum by flood water used to drive reservoir fluids to one or more producing wells.

7 Claims, 2 Drawing Figures

INVENTOR
HARLEY Y. JENNINGS, JR.

BY Ralph L. Freeland, Jr.
Frank E. Johnston
ATTORNEYS

BLOOD FLOOD

The present invention relates to assisted recovery of oil and gas. More particularly, it relates to the use of a use of a fraction (a selected part), or whole animal blood as an additive to a water flood to increase the recovery of gas or oil from a petroleum reservoir.

A particular object of this invention is to increase the recovery of petroleum from a reservoir by improving the oil to water mobility ratio in the displacement of oil or gas from the reservoir. For this purpose either whole animal blood or a selected fraction thereof is injected into the reservoir either alone or as an additive to conventional flooding water to increase total displacement of the reservoir oil or gas so that they will flow into a producing well. Particular advantages of such animal blood, in addition to abundance and cheapness, are that it has a viscosity about five times that of water, can be controlled to clot (polymerize) so that it effectively thickens flood water upon contact with fluids or rock surfaces in an earth formation forming a petroleum reservoir and it contains cells and platelets that act similarly to oil-in-water emulsions. All of these characteristics are desirable in improving oil-water mobility ratio so that the driving fluid and connate fluid move at the same rate through the reservoir rock.

In accordance with the present invention, the oil-water mobility ratio of an assisted recovery operation is improved by the addition of animal blood, presently a waste product in the slaughter of meat animals for which there is little or no market and which tends to add to the waste disposal problems of the meat packing industry. The animal blood may be either in an undiluted form or selectively separated to increase either the fibrinogen content or colloidal content (cells and platelets). It is then injected directly, or as an additive to the flooding fluid, normally water, into the reservoir from an injection well. Water is then pumped into the formation as in a conventional water flood. The water may of course be replaced in whole or part by liquefied gas, carbon dioxide, or the like. Preferably, animal blood or a fraction of it, is first added to the flood water and an inhibitor such as citric acid or EDTA (ethylenediaminetetraacetic acid) added to prevent polymerization of the fibrinogen portion before the mixture contacts the reservoir rock.

As discussed above, three separate mechanisms are believed to contribute to the increased oil-water mobility ratio that results in additional recovery of petroleum from a reservoir using blood or a blood fraction as the flooding liquid directly or as an additive to water or other liquids.

First, blood is about five times more viscous than water.

Second, this higher viscosity in the native or unreacted state is further increased by the clotting tendency upon contact with reservoir rock and fluids. It is believed to be due primarily to the polymerization of blood fibrinogen to form fibrin. The chemical reaction upon such contact forms microscopic filaments that lead to the formation of a solid gel.

Third, the cells and platelets of animal blood are colloidal materials which, either alone or in combination with fibrin formation tend to block or partially plug larger pore spaces. As is well known, large pore spaces in a producing formation normally form preferential permeability paths for flow of flood water so that smaller pore spaces containing oil particles are bypassed by the assisted recovery fluid. In fact it is oil in these small pore spaces, by-passed by primary fluid flow under normal producing conditions that results in much of the 50% or more original oil being left in the formation. Blockage or partial plugging of these larger pore spaces permits the drive fluid to move through the formation in a more piston-like displacement that moves a greater percentage of the in-place oil.

Further objects and advantages of the present invention will become apparent from the following detailed description taken with the drawing that forms an integral part of this specification.

Figure 1:
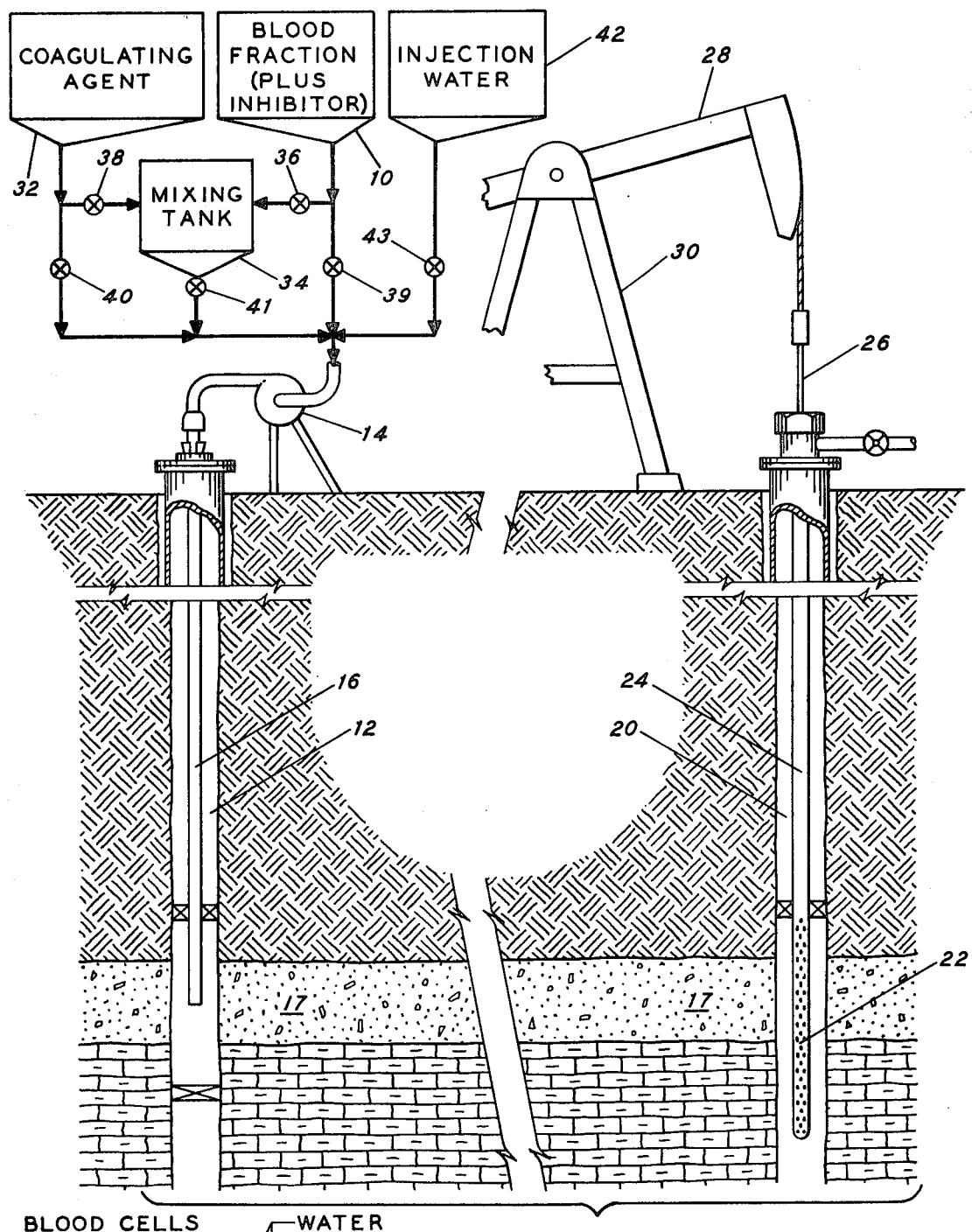
FIG. 1 is a schematic representation of an assisted recovery operation using animal blood as an additive to a fluid injected into a petroleum reservoir through an injection well to displace oil and gas toward a producing well encountering the same reservoir.

Referring now to the drawing, FIG. 1 illustrates schematically one method for using animal blood in the assisted recovery of oil. Animal blood from tank 10 is supplied to injection well 12 by injection pump 14 through injection tubing 16 to contact producing formation 17. Fluid in the petroleum reservoir formed by formation 17 then flows under the applied fluid pressure to producing well 20. The assisted recovery gas and oil is then produced from well 20 through tail pipe 22 and production string 24. A pump (not shown) in string 24 is operated by sucker rod 26 and rocker arm 28 of a conventional oil field pumping unit 30.

As indicated, the animal blood may be in the form of a fraction of the whole blood and generally will include an inhibitor such as citric acid or EDTA (ethylenediaminetetraacetic acid). This inhibitor is added to prevent premature polymerization of the fibrinogen of the animal blood to form fibrin. In most producing formations, such as 17, the connate fluids, in addition to the oil and gas, include a certain percentage of a water brine, frequently containing calcium or other divalent ions. These ions act as polymerizing or coagulating agents that will react with the inhibitor, such as citric acid or EDTA; this permits initiation of coagulation of the animal blood. In certain applications, the formation water may not contain sufficient ions to initiate the desired reaction within a reasonable time. Accordingly, a coagulating agent from tank 32 is mixed with the whole blood, with or without an inhibitor, in mixing tank 34. The amounts of blood fraction from supply tank 10 to mixing tank 34 is controlled by valve 36. Valve 38 controls coagulating agent flow from supply tank 32 to mixing tank 34. Valves 39, 40 and 41 regulate direct supply lines respectively from tanks 10, 32 and 34 to injection pump 14. Injection water is supplied from tank 42 through valve 43 at a pressure sufficient to drive the blood and any coagulating agent into the formation to sweep connate fluids toward producing well 20.

It has been known heretofore in biological work, particularly human biology, that blood normally tends to clot upon contact with most foreign substances, such as metals, foreign organic materials, and the like. A primary thrust of research involving this problem has been to find natural or synthetic materials that are inert enough so that minimum reaction occurs with the blood and thereby prevent clotting. In these studies, it has been learned that clots are formed by fibrin, which is polymerized fibrinogen. Fibrinogen is a globular protein from about 700 to 1000A. in length and 30 to 50A. in diameter. During polymerization, fibrinogen changes configuration by losing two peptide segments so that many molecules are associated together to form microscopic filaments which lead to the formation of a solid gel (clotting).

In accordance with the present invention, advantage is taken of this natural polymerization process by adding at least a fraction of whole blood, primarily the fraction containing fibrinogen to a petroleum reservoir. Desirably, polymerization is inhibited or controlled so that only a portion of the blood is coagulated prior to injection and contact with connate fluids in pore spaces of the reservoir rock.

Figure 2:
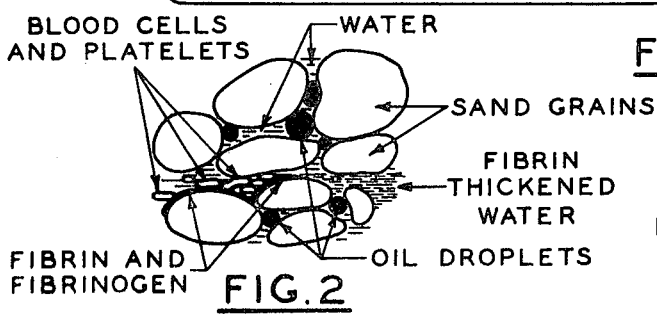
FIG. 2 is an enlarged, schematic representation of the pore space and grain structure of part of a petroleum reservoir useful in explaining, theoretically, the probable interaction of animal blood with formation fluids to assist recovery of gas and oil from the reservoir.

FIG. 2 illustrates diagrammatically a sandstone reservoir. The sand grains form pore spaces such that when interconnected, they form permeability channels or flow paths through the rock. When such a formation contains oil and is first produced, oil flow into a production well and expanding gas replaces the produced oil in the larger pores. In secondary or assisted recovery of oil from such formations by waterflooding the water flows into the more permeable, larger pores displacing the gas. The formation then contains a considerable quantity of water in these large, more permeable, passages and oil dropets as shown in FIG. 2. The oil is usually in the form of discreet droplets. These are primarily trapped in those pore spaces forming less permeable channels through the formation. In secondary or assisted recovery of oil from such formation, it is desirable to plug at least partially these more permeable passages containing water.

The present invention takes particular advantage of natural polymerization of animal blood to form fibrin to thicken the connate water, or even coat surfaces of passages containing primarily water. Additionally, if whole animal blood is used, blood cell and platelet fractions tend to assist in plugging the larger permeability passages, because the cells and platelets are about one micron in diameter. Particles of this size will block pore spaces several times this diameter by bridging; bridging in turn can be aided by polymerization or simple increase in viscosity of the connate fluid by addition of blood. Where blood does not in fact coat out on the surface of the reservoir rock grains, an increase in viscosity of the reservoir water with partially coagulated blood increases the mobility ratio of oil to water so that the injection water viscosity is much closer to or larger than the oil viscosity. In this way, pressure exerted on the injected water phase through an injection well tends to push oil out of the less permeable pore spaces by reducing the permeability of the preferred flow channels. Using laboratory cores containing oil experimental data indicates that injecting whole bovine blood, increases oil recovery prior to breakthrough of injection water by from 13 to 22 percent.

There are two special advantages to using whole animal blood for such assisted oil recovery. One relates to the waste disposal problem of bovine blood. In 1967, 4½ million barrels of such blood resulted from meat packing operations of beef alone. There is presently no substantial market for such bovine blood, apart from small quantities of fertilizer. A large percentage of it creates a severe waste disposal problem requiring sewage treatment to prevent water and air pollution. Use of blood for assisted recovery would largely avoid this problem since such petroleum reservoirs are deep enough to isolate them from surface waters and the atmosphere. Additionally, slaughter houses are widely scattered around the United States so that adequate supplies are readily available within reasonable distances of most oil field locations.

In certain applications it will be found advantageous to increase the ratio of the cell and platelet content of the injected blood fraction as compared to the fluid content. Accordingly, a partial extraction of the whole blood to preferentially separate cells and platelets from the plasma can be used to give a "tailored" characteristic to the injection fluid that may better suit the reservoir.

While bovine blood has been specified ed as the preferred material, such preference is based primarily upon its greater availability; however, large quantities of animal blood are also produced in the slaughter of poultry, swine, and sheep. These can be used with comparable results.

Following are examples of actual blood floods conducted under controlled laboratory conditions. Standard sandstone cores, typically used for evaluation of relative results of assisted recovery fluids were used:

EXAMPLE I

Standard laboratory displacement tests were carried out to show the effect of oil viscosity on floods with four Boise sandstone cores, two saturated with a white oil having a viscosity of 37 cps and two saturated with a white oil having a viscosity of 196 cps. The four cores were cut from the same piece of sandstone and had an average permeability of 1,117 md. The results obtained are presented in Table I.

TABLE I

| Core | Type Flood | Oil Recovery at Breakthrough (Percent Hydrocarbon Pore Vol.) | Oil Recovery at 2 Pore Volumes Fluid Injected (Percent Hydrocarbon Pore vol.) |
|---|---|---|---|
| | | Oil Viscosity 37 cps | |
| B | Water | 52 | 57 |
| D | Blood | 65 | 69 |
| | | Oil VIscosity 196 cps | |
| A | Water | 25 | 52 |
| C | Blood | 47 | 56 |

The blood flood resulted in a 13 percent greater oil recovery at breakthrough of the 37 cps oil and a 22 percent greater recovery of the 196 cps oil.

EXAMPLE II

Standard laboratory displacement tests were carried out to show the effect of an initial water saturation on blood floods with twelve Boise Sandstone cores saturated with water and a white oil having a viscosity of 196 cps. Six cores were prepared with an initial water and oil saturation and were water flooded. Six adjacent and practically identical cores were prepared with an initial water and oil saturation and were blood flooded. All twelve floods were carried out at a constant rate of 1.6 cc/min. at 74°F. The twelve cores had the following average properties:

air permeability – 1346 md
initial water saturation – 23 percent pore volume
oil permeability at start of flood – 1178 md The results obtained are presented in Table II.

TABLE II

| Core | Oil Recovery at Breakthrough (Percent Hydrocarbon Pore Volume) | Oil Recovery 2 Pore Volumes Fluid Injected Pore Volume) |
|---|---|---|
| Water Flood | | |
| 6A | 17 | 44 |
| 8A | 11 | 37 |
| 11A | 14 | 37 |
| 16A | 13 | 35 |
| 22A | 20 | 46 |
| 25A | 11 | 42 |
| Average | 14 Average | 40 |
| Blood Flood | | |
| 6B | 35 | 53 |
| 8B | 26 | 57 |
| 11B | 27 | 55 |
| 16B | 23 | 54 |
| 22B | 32 | 58 |
| 25B | 25 | 56 |
| Average | 28 Average | 56 |

The blood floods resulted in an 14 percent greater oil recovery at breakthrough than the water floods. This 14 percent increase was also present after two pore volumes of fluid had been injected.

The bovine blood was obtained from a conventional slaughter operation. As used in these tests, it was stabilized with EDTA (ethylenediaminetetraacetic acid), i.e., significant blood coagulation did not occur before injection; however, initial water saturation in each core in Example II was established with water containing 4,000 ppm calcium. This is believed to have reversed the action of the EDTA to stabilize the blood so that after injection coagulation was promoted. While coagulated blood was not observed at the outlet or inlet face of the cores, the injection pressures required to maintain the desired flow rate during the blood floods were 22 times higher than were required on the same cores using a straight water flood at the same injection rates. This increase in pressure was not attributed solely to the initial viscosity difference between the water and the blood, as this would have produced only a seven to eight fold increase in pressure.

While not essential to the operation of the method, it is speculated that the higher pressures observed in the blood floods as compared to water only may have been due in part to a "mechanical" plugging by red blood cells, as well as partial coagulation taking place in the cores. Evidence of blood cell plugging was not present on the surface of the core inlet face; however, due to the large size of these blood cells, as compared to the pore diameters of the sandstone, it is believed that some plugging did occur. The higher pressure can also be attributed to partial coagulation of the blood during injection, resulting in a higher viscosity. In either event, an increase in oil recovery did result, either by higher blood viscosity, or selective pore plugging, or both.

From the foregoing, it will be seen that my method of assisted recovery uses at least a fraction of animal blood to promote recovery of petroleum from a reservoir. Total recovery of such petroleum is improved for injection of the same volume of water normally used to assist such recovery from the rock. It will be understood that other materials may be added to the flooding water, either before or with the injection water and that the animal blood may be added either as a slug or injected with the displacing water as the assisted recovery operation proceeds.

All modifications of the disclosed method falling within the scope of the claims are intended to be covered by them.

I claim:

1. A method of assisting the recovery of oil from an earth formation penetrated by at least an injection well and a producing well which comprises supplying to said oil bearing formation from said injection well a quantity of whole blood in an amount sufficient so that the fibrinogen content of said whole blood polymerizes to form fibrin upon such injection into said formation thereby to increase the effective viscosity of the mixture of said blood and the formation fluids, said whole blood also including cells and platelets in an amount sufficient to plug partially the more permeable pore spaces of said formation, and then pumping water in an amount sufficient to displace said reacted blood and formation fluids toward said producing well to assist the recovery of oil from said formation.

2. A method in accordance with claim 1 wherein said fibrinogen is activated by calcium ion present in said water injected after introduction of said blood into said formation.

3. A method of improving the displacement of connate fluids, including oil, gas and water, from a producing formation by reducing preferentially the permeability of water flow paths relative to oil and gas in said formation by injecting into said formation at least a fraction of whole blood stabilized to prevent coagulation prior to contact with said formation, then injecting into said formation an agent adapted to partially coagulate said blood over the area of injection into said formation, and then supplying water at a pressure sufficient to drive said partially coagulated blood into said formation to sweep said connate fluids toward a producing well with less bypassing of injection water in the displacement of said connate fluids.

4. A method of assisting the recovery of oil from an earth formation penetrated by at least an injection well and a producing well which comprises supplying to said oil bearing formation from said injection well a quantity of fluid comprising water and at least a selected fraction of animal blood in an amount sufficient to interact with the connate fluid in said formation to control the viscosity and flow characteristics of fluids in said formation and then displacing said injected fluids into said formation from said injection well with additional flood water to assist the recovery of oil from said formation through said producing well.

5. A method in accordance with claim 4 wherein the fraction of animal blood is selected for its fibrinogen content and said fluid includes an inhibitor to prevent the formation of fibrin until said fluid contacts said oil bearing formation.

6. A method in accordance with claim 4 in which the animal blood fraction includes cells and platelets in an amount sufficient to block partially the pore structure of said formation to improve the injection profile of said additional flood water subsequently injected.

7. Method in accordance with claim 4 wherein the animal blood fraction is essentially whole blood in which the fibrinogen and cell content are controlled in accordance with a characteristic of the produced formation to obtain a combined effect in said flood water of blood cell and platelet plugging of the more permeable pore spaces of the reservoir rock with a simultaneous increase in viscosity of said flood water by formation of fibrin from the fibrinogen content of said blood upon contact with the reservoir rock and fluids in said earth formation thereby causing at least partial coagulation of said whole blood.

* * * * *